United States Patent [19]

O'Connor et al.

[11] 4,381,672
[45] May 3, 1983

[54] VIBRATING BEAM ROTATION SENSOR

[75] Inventors: James M. O'Connor, Farmington; David M. Shupe, Troy, both of Mich.

[73] Assignee: The Bendix Corporation, Southfield, Mich.

[21] Appl. No.: 240,518

[22] Filed: Mar. 4, 1981

[51] Int. Cl.³ .............................................. G01C 19/56
[52] U.S. Cl. ....................................... 73/505; 310/25; 310/309
[58] Field of Search ....................... 73/504, 505; 74/5; 310/25, 309

[56] References Cited

U.S. PATENT DOCUMENTS

| | | | |
|---|---|---|---|
| 2,974,530 | 3/1961 | Jaouen | 73/505 |
| 3,127,775 | 4/1964 | Hansen et al. | 73/505 |
| 3,141,100 | 7/1964 | Hart | 73/505 X |
| 3,201,998 | 8/1965 | Horn | 73/505 |
| 3,614,677 | 10/1971 | Wilfinger | 310/25 |
| 3,992,952 | 11/1976 | Hutton et al. | 73/505 |
| 4,264,838 | 4/1981 | Jacobson | 73/505 |
| 4,266,156 | 5/1981 | Kizaki | 310/344 |

OTHER PUBLICATIONS

"High-Q Selective Filters Using Mechanical Resonance of Silicon Beams" by Hribsek From IEEE Transactions on Circuits & Systems, vol. CAS 25, No. 4, Apr. 1978.
"Silicon Diffused Element Piezoresistive Diaphragms" by Tufte From Journal of Applied Physics, vol. 33, No. 11, Nov. 1962.
"Tracking Phase Locked Oscillator" by Kotzin From Motorola Technical Disclosure Bulletin, vol. 1, No. 1, Aug. 1980.
"Piezoelectric Vibrating Beam Rate Gyro" by Watson From Navy Technical Disclosure Bulletin, vol. 4, No. 6, Jun. 1979.
"Microprocessors Get Integrated Sensors" by Middelhock From IEEE Spectrum, Feb. 1980.
"Ein Piezoresistiver Halbleiter" by Bretschi From Feinwerktechnik & Messtechnik, vol. 83, No. 7, Nov. 1975.

Primary Examiner—James J. Gill
Attorney, Agent, or Firm—James R. Ignatowski; Russel C. Wells

[57] ABSTRACT

A rotation sensor having a vibrating cantilever beam is disclosed herein. The sensor comprises an integral single crystal silicon cantilever beam and support structure, an oscillator circuit for generating an electrical signal vibrating the cantilever beam at or near its natural resonant frequency and a piezoresistive element formed at the base of the base of the vibrating beam. The piezoresistive element is only sensitive to the stresses induced in the beam due to the rotation of the beam about an axis parallel to its length.

43 Claims, 6 Drawing Figures

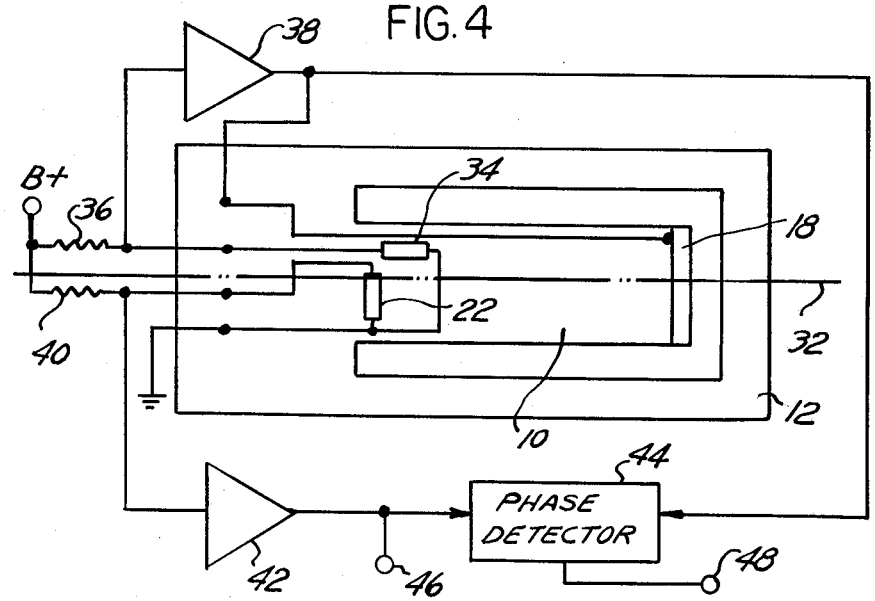
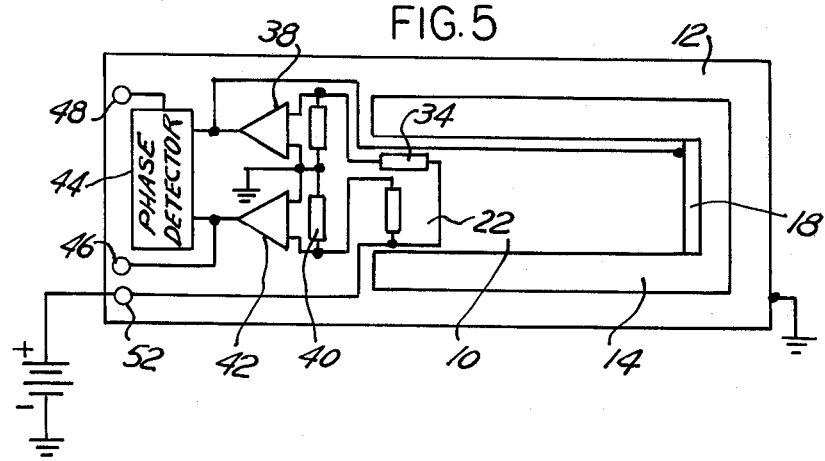
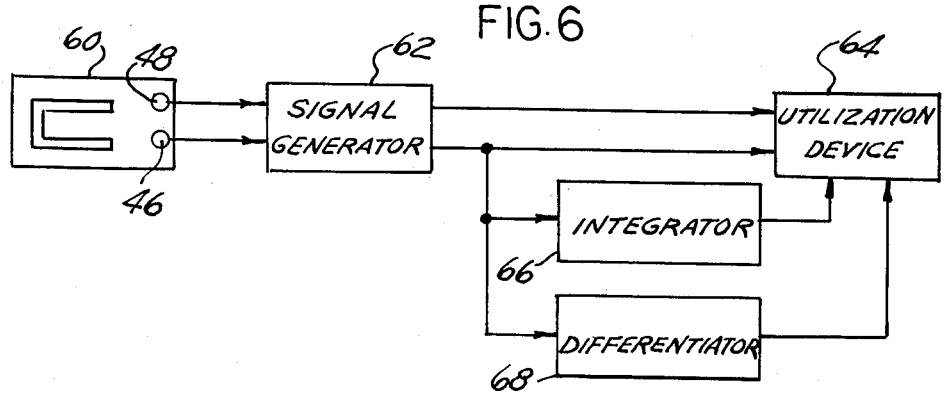

VIBRATING BEAM ROTATION SENSOR

BACKGROUND OF THE INVENTION

1. Field of the Invention

The invention is related to the field of rotation sensors and in particular to a vibrating beam rotation sensor.

2. Prior Art

The use of a vibrating reed or cantilever beam to detect a rotational velocity is known in the art. J. Lyman in U.S. Pat. No. 2,513,340 discloses a resiliently mounted electrically driven tuning fork. The vibration of the fork produces periodic changes in its moment of inertia. The periodic changes in the tuning fork's moment of inertia produce periodic forces opposing angular rotation. An angular lag or displacement between the resiliently mounted tuning fork and its base is proportional to the angular or rotational acceleration while the amplitude of the periodic force is proportional to the rotational velocity.

The concept of a single vibrating member is disclosed by Barnaby et al in U.S. Pat. No. 2,544,646. In his angular velocity measuring instrument, two serially connected reeds or cantilever beams are constrained to vibrate at right angles to each other. The first or lower beam is electrically stimulated to vibrate the upper beam. The moment of inertia of the upper beam will produce a periodically varying force resisting an angular displacement from its initial plane of vibration. This periodic force is proportional to the displacement. Rotation of the lower beam will cause the upper beam to vibrate in a plane normal to vibration plane of the lower beam. The vibration amplitude of the upper beam is proportional to the angular velocity of rotation. In two of Barnaby's embodiments, the upper and lower beams are piezoelectric crystals.

Mumme in U.S. Pat. No. 3,842,681 expands Barnaby's vibrating beam concept to a two axis angular rate sensor. In the sensor disclosed by Mumme, the lower vibrating reed is replaced by an oscillating rotary hub. Four cantilever beams are supported from the hub in a cruciform pattern normal to its oscillatory axis and are oscillated as rigid members. Coriolis forces generated by the oscillating cantilever beams oppose the rotation of sensor about one of the axes defined by the cruciform cantilever beam configuration and cause the beams defining the other axis to vibrate in a direction normal to the cruciform plane. The cantilever beams are made from a piezoelectric material which outputs a signal in response to their vibration normal to the cruciform plane.

SUMMARY OF THE INVENTION

The invention is rotation sensor having an electrically vibrated cantilevered silicon beam supported from an integral silicon support structure. A piezoresistive element is diffused on the surface of the beam at its base end which is only responsive to the stresses produced by the rotation of the vibrating beam about an axis parallel to its length. In the preferred embodiment the oscillator circuit for generating the electrical signals stimulating the vibration of the cantilever beam and amplifier circuits converting the resistance changes of the piezoresistive element to electrical signals are formed on the surface of the silicon substrate using existing integrated circuit technology.

One advantage of the invention is that the sensor has only two parts. Another advantage of the invention is that the piezoresistive elements and electronic circuits can be formed directly on the surfaces of the vibrating beam and the support structure respectively eliminating the need for ancillatory support electronics. Another advantage of the invention is that the associated electronics can be formed directly on the silicon surfaces of the sensor using existing integrated circuit fabrication techniques making the sensor relatively inexpensive to produce. Still another advantage of the sensor is that it is extremely small compared to comparable prior art sensors. These and other advantages of the invention will become apparent from reading the specification in conjunction with the accompanying drawings.

BRIEF DESCRIPTION OF THE DRAWINGS

FIG. 4 is a top view of a second embodiment of the rotation velocity sensor having a feedback piezorestive element.

FIG. 5 is a top view of a third embodiment of the rotation velocity sensor having the oscillator circuit and amplifier circuit formed directly on the surface of the silicon support structure.

FIG. 6 is a block diagram of the rotation sensor in combination with a utilization device.

DETAILED DESCRIPTION OF THE INVENTION

Figure 1:
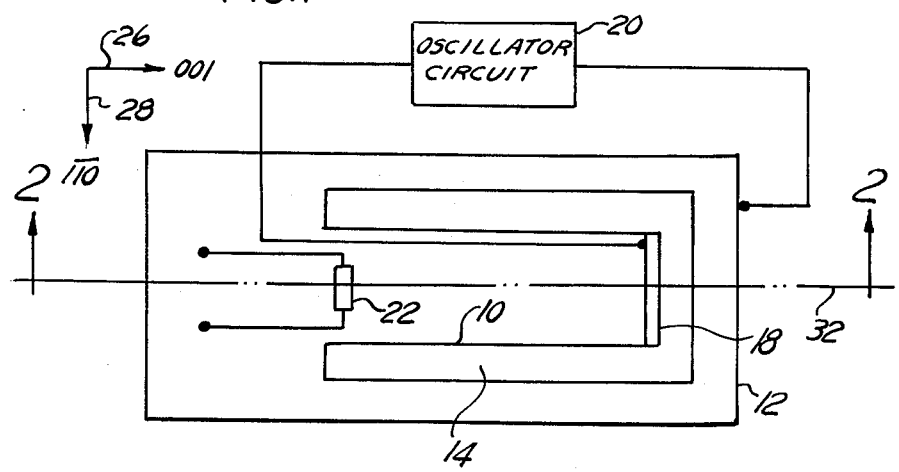
FIG. 1 is a top view of a first embodiment of the rotation velocity sensor.
Figure 2:
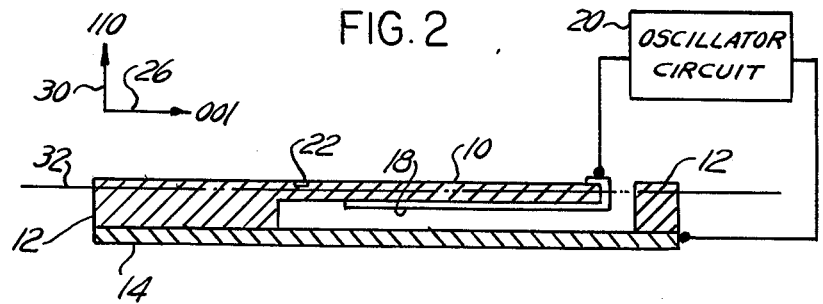
FIG. 2 is a cross sectional view of the embodiment shown in FIG. 1.
Figure 3:
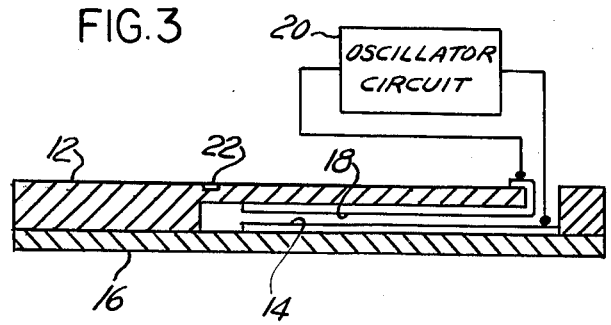
FIG. 3 is a cross sectional view of the sensor showing an alternate configuration for the base electrode.

A top and cross-sectional view of a first embodiment of the vibrating beam rotation sensor are shown or FIGS. 1 and 2 respectively. The vibrating beam rotation sensor embodies a thin single crystal silicon cantilever beam 10 suspended from an integral silicon support structure 12. The silicon beam 10 may be fabricated using the techniques disclosed by M. F. Hribsek and R. W. Newcomb in the article "High Q Selective Filters Using Mechanical Resonance of Silicon Beams." IEEE Transactions on Circuits and Systems Vol CAS 25, No. 4 April 1978. The silicon support structure is fused to a base electrode 14. The base electrode 14 may be a metal substrate as shown in FIG. 2 or may be a thin metalic electrode 14 disposed on the upper surface of a silicon or glass substrate 16 facing the cantilever beam 10 as shown in FIG. 3.

An oscillator 20 generates an alternating electrical potential difference between the base electrode 14 and a beam electrode 18 disposed along a surface of the cantilever beam 10. The beam electrode 18 may be disposed along the bottom of the beam 10 as shown in FIG. 2, however it may alternatively be disposed along the top surface of beam 10. The frequency of the oscillator 20 corresponds to the resonant frequency of the cantilever beam so that the alternating electric field between electrodes 14 and 18 produces a periodic electrostatic force vibrating beam 10 at or near its natural resonant frequency.

The crystallographic axes of the integral single crystal silicon beam 10 and support structure 12 are selected such that the 001 axis is parallel to the length of the beam and the 110 axis is normal to the length of the beam and parallel to the beam's top surface. The directions of the 001 and 1$\bar{1}$0 crystallographic axes are illustrated by arrows 26 and 28 respectively on FIG. 1. Similarly, the 001 and 110 crystallographic axes are illustrated by arrows 26 and 30 in FIG. 2.

A p-type piezorestive element 22 is disposed at the base end of beam 10 with its axis parallel to the 1$\bar{1}$0 axis of the beam's crystalline structure. The piezoresistive element may be implanted or diffused into the silicon structure of the beam using methods well known in the art. The orientation of the silicon's crystallographic axes with respect to the beam and the orientation of piezoresistive element are critical to the proper operation of the rotation sensor as will be discussed hereinafter.

The operation of the rotation sensor is as follows: The oscillator circuit 20 produces an oscillating electrostatic field between the beam electrode 18 and the base electrode 14. The oscillating electrostatic field produces a periodic electrostatic force on cantilevered beam 10 causing it to vibrate at or near its resonant frequency in a plane defined by the 001 and 110 axes of the crystallographic structure of beam 10.

The primary stresses produced in the vicinity piezoresistive element 22 due to the vibration of the beam are transverse to axis of the piezoresistive element 22. The sensitivity of the piezoresistive element to this transverse stress is given by:

$$\Delta R/R = \pi_l \rho_l + \pi_t \rho_t + \pi'_t \rho'_t$$

where $\Delta R$ is the change in resistivity of the piezoresistive element;

R is the unstrained resistance of the piezoresistive element;

$\pi_l$, $\pi_t$ and $\pi'_t$ are the piezoresistive coefficients longitudinal and transverse to the piezoresistive elements' axis and $\rho_l$, $\rho_t$ and $\rho'_t$ are the corresponding stresses.

The values for $\pi_l$ and $\pi_t$ for a p-type piezoresistive layer are given by O. N. Tufte et al, in the article "Silicon Diffused-Element Piezoresistive Diaphragms" published in the Journal of Applied Physics, Volume 33, November 11, pages 3322–3327, November 1961. The transverse piezoresistive coefficient, $\pi_t$, for a p-type element with this orientation is zero. The stresses along the 110 and 1$\bar{1}$0 axes due to the simple vibration of the beam are vanishing small and can be ignored. The piezoresistive element 22 therefore is insensitive to the simple vibration of the beam in the plane defined by the 110 and 001 axes of the single crystal silicon beam.

As discussed with reference to the vibrating rotation sensors of the prior art, the law of conservation of angular momentum will tend to keep the beam 10 vibrating in it's initial plane of vibration unless acted on by a torque. Rotation of the substrate 12 about an axis 32 passing through the length of the beam 10 will produce a torque on beam 10, resulting in a stress along the 1$\bar{1}$0 crystallographic axis. The piezoresistive element 22 located at the base of the beam will respond to this stress and produce a change $\Delta R$ in its resistance value R. The sensitivity of a p-type lightly doped silicon piezoresistive element for a longitudinal stress is $$\Delta R/R = (\pi_{44}/2)\rho_l + \pi'_t \rho'_t$$

where $\pi_{44}$ has a value $138 \times 10^{-12}$ cm$^2$/dyne and $\rho_l$ is the stress produced due to the moment of inertia of the vibrating beam resisting rotation. The factors $\pi'_t$ and $\rho'_t$ as taught by O. N. Tufle et al are only possible second order components of a transverse stress produced by the twisting force. Therefore a rotation of the sensor about axis 32 passing through the length of beam 10 will produce a change, $\Delta R$, in the value of the piezoresistive element proportional to force produced by the vibrating beam 10 resisting rotation. Because the force resisting rotation is proportional to the vibrating beam's moment of inertia, the change $\Delta R$ in the resistance of the piezoresistive element 22 will fluctuate at a frequency corresponding to the frequency vibrating beam 10 and have a magnitude proportion to the rate at which the support structure is rotated.

A second embodiment of the vibrating beam rotation sensor is shown on FIG. 4. This embodiment of the sensor is basically the same as shown on FIGS. 1 and 2 but includes a second piezoresistive element 34 disposed on the surface of the beam 10 having its length or axis parallel to the 001 crystallographic axis.

The piezoresistive element 34 is connected in series with a fixed resistance element 36 between a source of electrical power designated B+ and a common ground. The junction between fixed resistance element 36 and piezoresistive element 34 is connected to an operational amplifier 38. The output of amplifier 38 is connected to the beam electrode 18 and a phase detector 44.

The piezoresistive element 22 is connected in series with a second fixed resistance element 40 between the source of electrical power and a common ground. The junction between fixed resistance element 40 and piezoresistive element 22 is connected to the input of an operational amplifier 42 having its output connected to the phase detector 44 and an output terminal 46. The phase detector 44 produces an output on terminal 48. As is known in the art, terminals 46 and 48 may be connected to a display or utilization device such as an automatic pilot for an aircraft or a guidance system for a missile.

The operation of the rotation sensor illustrated on FIG. 4 is as follows: Piezoresistive element 34 in contrast to piezoresistive element 22 is sensitive to the vibration of beam 10, and its resistance will oscillate between a maximum and minimum values in synchronization with the vibration of beam 10. The serially connected fixed resistance element 36 and piezoresistive element 34 form a voltage divider network generating an oscillating signal, at its junction, having a frequency corresponding to the resonant frequency of beam 10. This signal is amplified by operational amplifier 38 and the amplified signal is applied between base electrode 14 and beam electrode 18 producing an electrostatic force sustaining the vibration of beam 10. The combination of beam 10, piezoresistive element 34 and amplifier 38 function as conventional Hartley oscillator where the beam 10 is equivalent to a tuned circuit and piezoresistive element 34 provides the required feedback signal. It is assumed that the operational amplifier 38 includes any necessary phase shift capabilities such that its amplified signal applied between electrodes 14 and 18 will have the proper phase for sustaining the vibration of beam 10.

Piezoresistive element 22, as described with reference to FIGS. 1 and 2, is insensitive to the simple vibration of beam 10 but will change value in response to any stress generated when the support substate is rotated about axis of rotation 32. This change in resistance is converted to a voltage signal at the junction between fixed resistance element 40 and piezoresistive element 22. This voltage signal is amplified by operational amplifier 42 which functions as a buffer amplifier. The output of amplifier 42 is a signal having a value indicative of the rate at which the support structure is being rotated and a phase with respect to the vibration of the beam 10 indicative of the direction in which the support structure is rotated. The phase of the output signals of amplifiers 38 and 42 are compared in the phase detector 44 which outputs a first signal when the two signals are in phase indicating the support structure is being rotated in a first direction and a second signal when the two signals are 180 degrees out of phase indicating the support structure is being rotated in the opposite direction.

Referring now to FIG. 5, fixed resistance elements 36 and 40 may be diffused or implanted directly on the surface of the support structure 12 along with operational amplifiers 38 and 42 using existing integrated circuit technology. A power source, such as battery 50 delivers electrical power the integrated electronic circuits and piezoresistive elements via terminal 52. Terminal 46 receives the output of amplifier 42 indicative of the rate at which the support substrate is rotating about the axes of rotation 32 and is equivalent to terminal 46 discussed with reference to FIG. 4. The phase detector 44 may be a separate entity as shown with respect to FIG. 4 or may also be formed on the surface of the silicon support structure along with amplifier 38 and 42 as shown on FIG. 5.

Referring now to FIG. 6, there is shown a rotation sensor 60 of the type shown in FIG. 5 in conjunction with a utilization device 64. Utilization device 64 may be an automatic pilot for an aircraft, a guidance system for a missile, or simply a display panel. The output signals on terminals 46 and 48 of rotation sensor 60 are the outputs of amplifier 42 and phase detector 44 as discussed relative to FIG. 5. Terminals 46 and 48 are connected to a signal generator 62 which converts the amplitude of the signal output by amplifier 42 into a rotational velocity signal. This rotational velocity signal may be an analog signal, a frequency signal or a digital signal indicative of the sensed rotational velocity. The signal generator 62 also outputs a signal indicative of the rotational direction. The outputs of the signal generator 62 are received by the utilization device 64.

The rotational velocity signal generated by the signal generator 62 may also be received by an integrator 66 which integrates the rotational velocity signal with respect to time to generate an attitude or displacement signal indicative of the total rotational (angular) displacement of the sensor from a reference position. The attitude signal may also be received and utilized by the utilization device.

The rotational velocity signal generated by the signal generator 62 may also be received by a differentiator 68 which differentiates the rotational velocity signal with respect to time to generate a rotational (angular) acceleration signal indicative of the rotational acceleration of the sensor 60. The rotational acceleration signal may also be received and utilized by the utilization device 64.

It is not intended that the invention be limited to the exact configuration shown, materials or circuits discussed herein. It is submitted that one skilled in the art may make changes or modifications without departing from the spirit of the invention as disclosed or set forth in the appended claims.

What is claimed is:

1. A rotation sensor comprising:
a single crystal support structure having an axis of rotation;
an integral cantilever beam supported from said support structure for vibration only in a predetermined plane relative to said support structure and parallel to said axis of rotation, said cantilever beam having a base end attached to said support structure and a free end;
means for vibrating the free end of said cantilever beam in said predetermined plane; and
first sensor means for detecting transverse stresses at said base resisting rotation of said vibrating cantilever beam about said axis to generate a signal having a value corresponding to the rotational velocity of said support structure about said axis of rotation.

2. The rotation sensor of claim 1 wherein said means for vibrating said cantilever beam comprises:
a beam electrode disposed on a surface of said cantilever beam;
a fixed electrode supported by said support structure proximate said beam electrode; and
oscillator means for generating an oscillating electric potential between said beam electrode and said fixed electrode to produce an electrostatic force vibrating said cantilever beam.

3. The rotation sensor of claim 2 wherein said oscillator means comprises:
second sensor means for detecting the vibration of said cantilever beam to produce a signal having a frequency component corresponding to the vibration frequency of the cantilever beam; and
amplifier means for amplifying the signal generated by said second sensor to generate said oscillating electric potential between said beam and fixed electrode.

4. The rotation sensor of claim 1 wherein said single crystal material is single crystal silicon.

5. The rotation sensor of claim 4 wherein said single crystal silicon has a 001 crystallagraphic axis parallel to said axes of rotation and a $\overline{1}10$ crystallographic axis normal to said 001 axis.

6. The rotation sensor of claim 5 wherein said cantilever beam has a rectangular configuration, said $\overline{1}10$ crystallographic axis is parallel to one surface of said cantilever beam.

7. The rotation sensor of claim 6 wherein said one surface is normal to the cantilever beams plane of vibration.

8. The rotation sensor of claim 6 or 7 wherein said first sensor means is a p-type piezoresistive element formed on said one surface of said cantilever beam adjacent to said base end, said piezoresistive element having an axis parallel to said $\overline{1}10$ crystallographic axis.

9. The rotation sensor of claim 7 wherein said first sensor means comprises:
a p-type piezoresistive element formed in said one surface adjacent to said base end, said piezoresistive element having an axis parallel to said $\overline{1}10$ crystallographic axis, and
first amplifier circuit means formed in the surface of said support structure and connected to said piezoresistive element for generating an output signal having a value indicative of the resistance value of said piezoresistive element.

10. The rotation sensor of claim 9 wherein said means for vibrating said cantilever beam comprises:
a beam electrode disposed the surface of said cantilever beam opposite said one surface;
a fixed electrode regidly supported by said support structure proximate said beam electrode; and oscillator means for generating an oscillating electric potential between said beam electrode and said fixed electrode to produce an electrostatic force vibrating said beam.

11. The rotation sensor of claim 10 wherein said oscillator means comprises:
a second piezoresistive element formed on the surface of said cantilever beam adjacent to its base end, said second piezoresistive having a resistance value oscillating in response to the vibration of said cantilever beam; and
an integrated oscillator circuit formed on the surface of said support structure, said integrated oscillator circuit generating said oscillating electric potential between said beam electrode and said fixed electrode in response to the oscillating resistance value of said second piezoresistive element.

12. The rotation sensor of claim 10 further including phase detector means for detecting the phase relationship between said oscillator means and the output of said first amplifier circuit means to generate a signal indicating the direction of rotation of said support structure.

13. The rotation sensor of claims 10 or 12 further including integrator means for integrating the output of said first amplifier circuit means to generate a displacement signal indicative of the total angular displacement of said support structure from a predetermined position.

14. The rotation sensor of claims 10 or 12 further including differentiator means for differentiating the output of said first amplifier means to generate an acceleration signal indicative of the angular acceleration of said support structure.

15. The rotation sensor of claims 10 or 12 further including:
integrator means for integrating the output of said first amplifier circuit means to generate a displacement signal indicative of the total angular displacement of said support structure from a predetermined position; and
differentiator means for differentiating the output of said first amplifier means to generate an acceleration signal indicative of the angular acceleration of said support structure.

16. The rotation sensor of claim 5 wherein said means for vibrating said cantilever beam comprises:
a beam electrode disposed on a surface of said cantilever beam;
a fixed electrode rigidly supported from said support structure proximate said beam electrode; and
oscillator means for generating an oscillating electric potential between said beam and fixed electrodes to produce an electrostatic force vibrating said cantilever beam.

17. The rotation sensor of claim 16 wherein said oscillator means comprises:
second sensor means for detecting the vibration of said cantilever beam to generate an output signal having a frequency corresponding to the vibrating frequency of the cantilever beams; and
second amplifier means for amplifying said output signal to generate said oscillating electric potential.

18. The rotation sensor of claim 17 wherein said second sensor means is a second piezoresistive element formed on the surface of said cantilever beam adjacent to its base end and said amplifier is an integrated circuit formed on the surface of said support structure.

19. The rotation sensor of claim 18 wherein said second piezoresistive element has its axis parallel to the 001 crystallographic axis of said integral structure.

20. The rotation sensor of claim 1 further including phase detector means for detecting the phase relationship between said vibrating cantilever beam and the signal generated by said first sensor to generate a signal indicating the direction of rotation of said support structure.

21. The rotation sensor of claims 1 or 20 further including integrator means for integrating the signal generated by said first sensor means to generate a displacement signal indicative of the total angular displacement of said support structure from a predetermined position.

22. The rotation sensor of claims 1 or 20 further including differentiator means for differentiating the signal generated by said first sensor to generate an acceleration signal indicative of the angular acceleration of said support structure.

23. The rotation sensor of claims 1 or 20 further including:
integrator means for integrating the signal generated by said first sensor to generate a displacement signal indicative of the total angular displacement of said support structure from a predetermined position; and
differentiator means for differentiating the signal generated by said first detector to generate an acceleration signal indicative of the angular acceleration of said support structure.

24. A micromechanical angular rate sensor comprising:
an integral single crystal support structure and cantilever beam, said cantilever beam supported from said support structure parallel to an axis of rotation;
means for vibrating said cantilever beam in a plane parallel to said axis of rotation; and
first sensor means for detecting the stresses at the base of said cantilever beam in a plane normal to said axis of rotation to generate a rate signal indicative of the rotation of said support structure about said axis of rotation.

25. The angular rate sensor of claim 24 wherein said single crystal is single crystal silicon.

26. The angular rate sensor of claim 25 wherein said single crystal silicon a 001 crystallographic axis parallel to said axis of rotation and a $1\bar{1}0$ crystallographic axis normal to said 001 axis; and
said sensor means is a p-type piezoresistive element formed on said cantilever beam adjacent to said support structure, said piezoresistive element having an axis parallel to said $1\bar{1}0$ crystallographic axis.

27. The angular rate sensor of claim 26 further including first amplifier circuit means formed on the surface of said support structure and connected to said piezoresistive element for generating an output signal having a value indicative of the resistance value of said piezoresistive element.

28. The angular rate sensor of claim 26 wherein said means for vibrating said cantilever beam comprises:
a beam electrode disposed on a surface of said cantilever beam;
a fixed electrode supported by said support structure proximate said beam electrode; and
oscillator means for generating an oscillating electric potential between said beam electrode and said fixed electrode to produce an electrostatic force vibrating said cantilever beam.

29. The angular rate sensor of claim 28 wherein said oscillator means comprises:

second sensor means for detecting the vibration of said cantilever beam to generate an output signal having a frequency corresponding to the vibrating frequency of the cantilever beams; and second amplifier means for amplifying said output signal to generate said oscillating electric potential.

30. The angular rate sensor of claim 29 wherein said second sensor means is a second piezoresistive element formed on the surface of said cantilever beam adjacent to said support structure and said amplifier is an integrated circuit formed on the surface of said support structure.

31. The angular rate sensor of claim 29 further including phase detector means for detecting the phase relationship between the output signals of said first and second amplifiers to generate a direction signal indicating the direction the support structure is rotating with respect to axis.

32. The angular rate sensor of claim 31 further including integrator means for integrating the output of said first amplifier with respect to time to generate a displacement signal indicative of the total angular displacement of said support structure from a predetermined position.

33. The angular rate sensor of claim 31 or 32 further including a differentiator circuit for differentiating the output of said first amplifier with respect to time to generate a signal indicative of the angular acceleration of sid support structure.

34. A method for sensing a rotation comprising the steps of:

vibrating a single crystal silicon cantilever beam in a predetermined plane relative to a support structure; and detecting the stress induced in said cantilever beam resisting the displacement of said vibrating beam from said predetermined plane due to a rotation of said support structure to generate a rate signal having a value proportional to the rate of rotation.

35. The method of claim 34 wherein the 001 crystallographic axis of said single crystal silicon is parallel to the length of said cantilever beam and said 1$\bar{1}$0 crystallographic axis is normal to said beam, said step of vibrating vibrates said beam in a plane normal to said 1$\bar{1}$0 crystallographic axis and said step of detecting includes detecting with a piezoresistive element formed on the surface of said cantilever beam with its length parallel to said 1$\bar{1}$0 crystallographic axis to generate said rate signal having a value proportional to the stress induced in said cantilever beam due to a rotation about an axis parallel to said 001 crystallographic axis.

36. The method of claim 35 wherein said step of detecting further includes converting the changes in the resistance value of said piezoresistive element due to said rotation to generate an electrical rate signal having a value proportional to the rate of rotation.

37. The method of claim 36 wherein said step of vibrating comprises:

generating an oscillating electrical signal;

applying said oscillating signal between a fixed electrode and an electrode disposed on said cantilever beam to generate an electric field therebetween and produce an electrostatic force vibrating said beam.

38. The method of claim 37 wherein said step of generating an oscillating electrical signal generates an oscillating electric signal having a frequency corresponding to the resonant frequency of said cantilever beam.

39. The method of claim 38 wherein said step of generating an oscillating field comprises the steps of:

detecting the vibration of said cantilever beam to generate an intput signal having a frequency component corresponding to the vibrating frequency of said beam; and amplifying said input signal to generate said electrical signal.

40. The method of claim 39 wherein said step of detecting the vibration frequency of said cantilever beam comprises the steps of:

detecting with a piezoresistive element formed on the surfaces of said beam the stresses induced in said beam due to its vibration.

41. The method of claim 40 further including the step of differentiating said rate signal to generate an angular acceleration signal.

42. The method of claim 37 further including the step of comparing the phase of said electrical rate signal with said electrical signal to generate a phase signal indicative of the direction of rotation.

43. The method of claims 40 or 42 further including the step of integrating said rate signal to generate a displacement signal indicative of the angle through which the vibrating cantilever beam was rotated.

* * * * *